United States Patent [19]
Bingham

[11] 3,919,714
[45] Nov. 11, 1975

[54] AUTOMATIC PEAKING APPARATUS

[75] Inventor: Joseph Peter Bingham, Princeton Junction, N.J.

[73] Assignee: RCA Corporation, New York, N.Y.

[22] Filed: Oct. 21, 1974

[21] Appl. No.: 516,491

[52] U.S. Cl. .......... 358/38
[51] Int. Cl.[2] .......... H04N 9/535
[58] Field of Search .......... 358/27, 37, 38, 39; 178/DIG. 19

[56] References Cited

UNITED STATES PATENTS

| | | | |
|---|---|---|---|
| 2,798,900 | 7/1957 | Bradley | 358/38 |
| 2,921,121 | 1/1960 | Grundmann et al. | 358/37 |

*Primary Examiner*—George H. Libman
*Attorney, Agent, or Firm*—Eugene M. Whitacre; Peter M. Emanuel

[57] ABSTRACT

A signal delaying circuit is coupled to a source of television video signals. A plurality of signal coupling circuits are coupled to the signal delaying circuit for developing a plurality of delayed video signals. At least a first and a second of the delayed video signals, spaced apart in time by a time interval substantially equal to NT/2, where T is the period of a signal component of the video signals and N is an integer greater than one, are combined to form a combined signal. A bandwidth determining signal is derived from at least a third of the delayed video signals spaced in time between the first and second delayed video signals. A peak response determining signal is derived by further combining the combined signal and the bandwidth determining signal. The amplitude of the peak response determining signal is controlled as a function of a control signal. In illustrative embodiments the apparatus is utilized to provide automatic luminance channel peaking and automatic color or chroma control (ACC).

15 Claims, 6 Drawing Figures

AUTOMATIC PEAKING APPARATUS

This invention relates to apparatus for shaping the amplitude versus frequency transfer characteristics of television signal processing apparatus and particularly relates to apparatus for automatically controlling the peaking characteristics of television signal processing apparatus.

It is often desirable to accentuate the amplitude of signals in a particular frequency range while attenuating signals outside of that frequency range. For example, it is desirable in the luminance channel of a color televisin receiver to accentuate or peak the amplitude of relatively high frequency components of luminance signals to improve the transient response of the receiver while attenuating chrominance or sound signals or both which may be present in the luminance channel and which may otherwise cause the formation of patterns annoying to the viewer.

Furthermore, for example, it is desirable in the chrominance channel to extract chrominance signals from the composite video signal as part of the color demodulation process. It may also be desirable to automatically control the amplitude of relatively high frequency signal components in response to a control signal. For example, since high frequency signals may tend to be attenuated more than lower frequency signals in a transmission channel, it is desirable to automatically control the amplitudes of relatively high frequency signals in accordance with the undesired amount of attenuation of these signals. Thus, chrominance channels may include automatic chroma control (ACC) apparatus for controlling the amplitude of signals in the range of frequency of the chrominance signals in accordance with amplitude degradations of a high frequency test or reference signal. Color burst signals, included in the composite video signal and representing color reference phase information, are commonly used as the test signal for ACC.

Lumped parameter circuits are known for shaping the amplitude versus frequency transfer characteristics of signal processing systems for the purpose of accentuating amplitudes of signals in a particular frequency range while attenuating signals outside that range. Automatic gain control circuits are known which may be used in conjunction with these lumped parameter circuits and associated electronic amplifier devices to effect automatic control of the amplitude of the accentuated signals.

Unfortunately, lumped parameter circuits for shaping the amplitude versus frequency transfer characteristic of a signal processing system tend to exhibit nonlinear phase versus frequency transfer characteristics (phase distortion). Phase distortion is primarily manifested by the presence of undesirable, unsymmetrical preshoots, overshoots and ringing in the processed signal. When video signals are processed in television receivers including apparatus for improving high frequency response but having uncorrected non-linear phase characteristics, the images generated in accordance with the processed video signals may be annoying to the viewer. Thus, unless a lumped parameter circuit provides for a linear phase versus frequency transfer characteristic, generally requiring complex and expensive circuitry, it may be undesirable for many applications.

It is known that a desired amplitude or phase characteristic (or both) as a function of frequency may be formed in an apparatus wherein delayed signals generated at signal coupling points (usually referred to as taps) along a delay line or like device are combined in a predetermined manner to obtain the desired characteristic. Such apparatus is described in U.S. Pat. No. 2,263,376, entitled, "Electric Wave Filter, or the Like," issued to A. D. Blumlein et al. on Nov. 18, 1941; an article entitled, "Transversal Filters," by H. E. Kallman, appearing in the *Proceedings of the I.R.E.*, Volume 28, Number 7, pages 302–310, July 1940; and article entitled, "Selectivity and Transient Response Synthesis," by R. W. Sonnenfeldt, appearing in *I.R.E. Transactions on Broadcast and Television Receivers*, Volume BTR-1, Number 3, pages 1–8, July 1955; and an article entitled, "A Transversal Equalizer for Television Circuits," by R. V. Sperry and D. Surenian, appearing in Bell System *Technical Journal*, Volume 39, Number 2, pages 405–422, March 1960.

Such apparatus, sometimes called a transversal equalizer or filter, is generally useful for a variety of applications in the signal processing field. For instance, such apparatus may be found useful in horizontal and vertical aperture beam correction, as is described in U.S. Pat. No. 2,759,044, entitled, "Beam Aperture Correction in Horizontal and Vertical Direction," issued to B. M. Oliver on Aug. 14, 1956, and U.S. Pat. No. 3,732,360, entitled, "Color Television System Having Aperture Correction," issued to H. Breimer and S. L. Tan on May 8, 1973. In addition, U.S. Pat. No. 2,922,965, entitled, "Aperture Equalizer and Phase Correction for Television," issued to C. W. Harrison on Jan. 26, 1960, described another apparatus of the type described in the Oliver patent wherein a reflective termination is coupled to a delay line having a plurality of taps to reduce the number of taps required.

In another application of a delay line described in U.S. Pat. No. 3,749,824, entitled, "Suppression Filter for Carrier-Chrominance Signals Utilizing a Tapped Delay Line," issued to T. Sagashima et al. on July 31, 1973. a reflective termination is selectively coupled to one end of a luminance channel delay line during color transmission to suppress chrominance signals. The delay line also serves to compensate for the time delays of signals processed in the luminance and chrominance channels.

In a dissertation submitted to the Faculty of the Graduate School of the University of Maryland in partial fulfillment of the requirements for the degree of Doctor of Philosophy, entitled, "Linear Distortion of the N.T.S.C. Color Television Signal," by J. P. Bingham (the present inventor) in 1970, and in an article entitled, "Automatic Equalization Using Transversal Filters," by H. Rudin, Jr., appearing in the *IEEE Spectrum*, 1967, transversal equalizers are described for automatically correcting degraded video signals in response to a control signal derived by comparing the video signal to a reference signal.

In a co-pending and related patent application Ser. No. 486,241, entitled, "Television Signal Processing Apparatus," by the same inventor as the present invention, filed July 5, 1974, and assigned to the same assignee as the present invention, apparatus is described for improving the transient response of a television video signal processing apparatus by relatively increasing the amplitudes of relatively high frequency components of the luminance signals while relatively attenuating chrominance or sound signals or both, which would without their attenuation otherwise produce undesirable visible patterns. The apparatus includes a delay line responsive to television video signals which is provided with a plurality of taps to generate a plurality of delayed video signals. The delayed video signals are combined to provide a luminance channel with a particular desired amplitude versus frequency transfer characteristic.

The apparatus described in the co-pending application also provides for readily controllable preshoots and overshoots. Further, the apparatus has provisions for adjusting the amplitude of the peak of the amplitude versus frequency characteristic of the output signal which does not substantially affect the amplitudes of the D.C. components or the amplitudes of the frequency components around a frequency *f* such as the color subcarrier or sound intercarrier frequency. Further, the apparatus is arranged so that a portion of the delay line can be utilized for equalizing the time delay differentials of the signals processed in the chrominance and luminance channels.

The present invention is useful in an apparatus for automatically controlling the amplitude of signals in a particular frequency range in response to a control signal. Illustrative embodiments of the invention include automatic color control apparatus and automatic luminance channel peaking control apparatus.

In accordance with the present invention, plurality of signal coupling means are coupled to a signal delaying means, responsive to video signals, for developing a plurality of delayed video signals. A first combined signal is produced by combining at least a first and a second of the delayed video signals being spaced apart in time by a time interval substantially equal to NT/2, where T is the period of a predetermined signal component of the video signals and N is an integer greater than one. A bandwidth determining signal is derived from at least a third of the delayed video signals. A second combined signal is produced by combining the bandwidth determining signals with the first combined signal. The amplitude of the second combined signal is controlled in response to a control signal derived from a predetermined portion of the video signals. An output signal is derived from at least the amplitude controlled second combined signal.

In accordance with another aspect of the invention, the control signal represents amplitude degradations of relatively high frequency components of the video signals.

These and other aspects of the present invention will best be understood by the following detailed description in conjunction with the accompanying drawing, in which.

Figure 1:
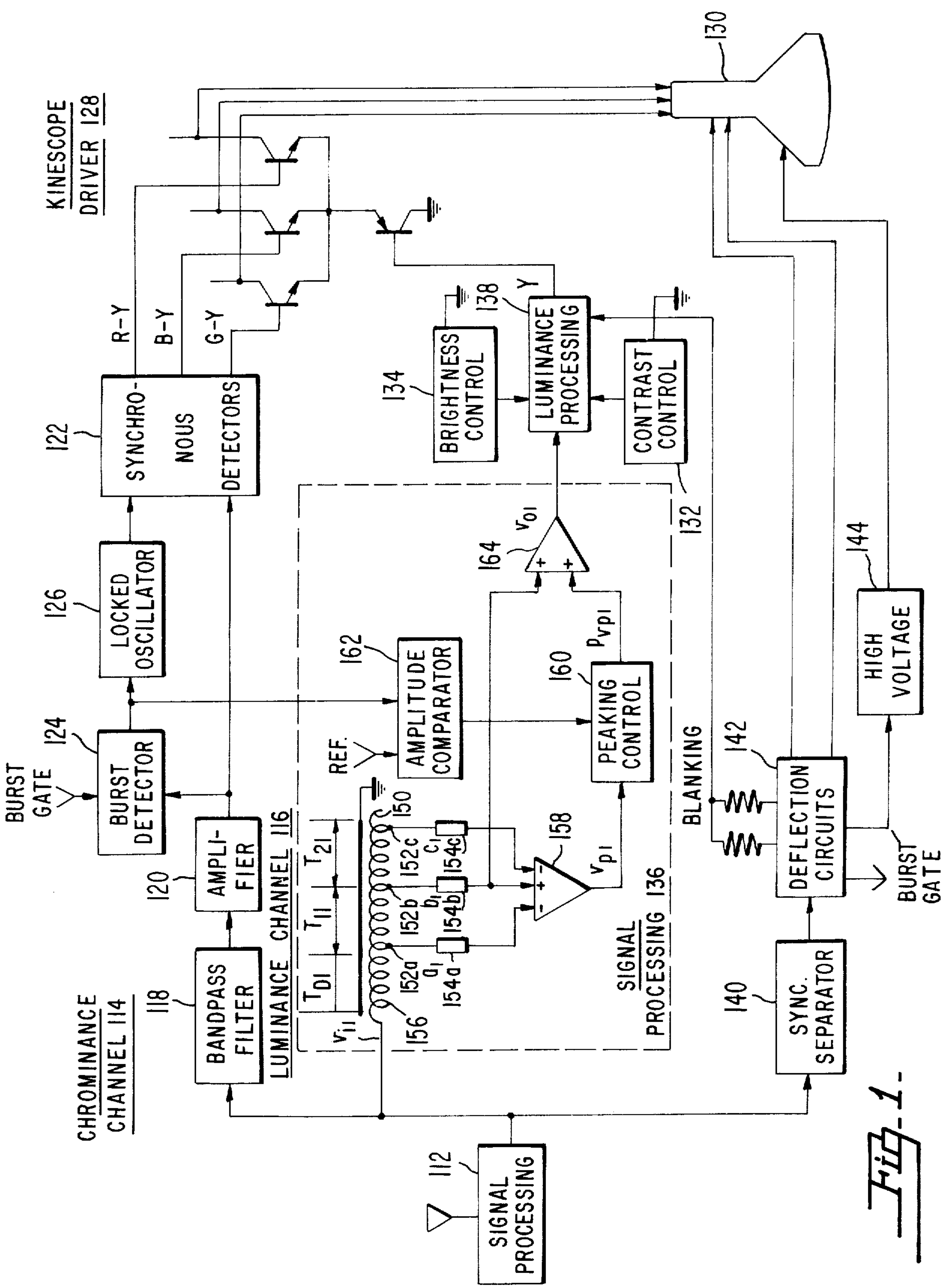
FIG. 1 shows, partially in block diagram form and partially in schematic form, the general arrangement of a color television receiver employing an embodiment of the present invention for processing luminance signals.

Referring now to FIG. 1, the general arrangement of a color television receiver employing the present invention includes a signal processing unit 112 responsive to radio frequency (RF) television signals, received by an antenna, for generating by means of suitable intermediate frequency circuits (not shown) and detection circuits (not shown) a composite video signal comprising chrominance, luminance, sound and synchronizing signal components. The luminance, sound and synchronizing signal components. The luminance signals have a relative wide bandwith (e.g., approximately 4 MHz) with a lower frequency range, extending down to direct current (zero frequency), and a higher frequency range. The higher frequency range (e.g., approximately 2–5 MHz) also includes chrominance and sound signals. The chrominance signals have the form of a modulated color subcarrier signal and are arranged in frequency in relation to the frequency (e.g., 3.58 MHz) of the color subcarrier signal. The sound signals have the form of a modulated sound intercarrier signal and are arranged in frequency in relation to the frequency (e.g., 4.5 MHz) of the sound subcarrier signal. The sharp transition and fine detail information of the image is contained in the relatively high frequency signal components of the luminance signals.

The output of signal processing unit 112 is coupled to a chrominance channel 114 and a luminance channel 116. Chrominance channel 114 includes a bandpass filter 118 which serves to extract signals in the frequency range (e.g., approximately 2.1 MHz to 4.2 MHz) of the chhrominance signals from the composite video signal. The output signal of bandpass filter 118 is amplified by an amplifier 120 and is then coupled to a synchronous detector 122. The output signal of amplifier 120 is also coupled to a burst detector 124 together with a burst gate signal generated by deflection circuits 142. The burst gate signal comprises pulses synchronized in relation to the synchronization pulses produced by sync separator 140 and represents the time location of color burst signals included in the composite video signal. Burst detector 124 serves to extract the color burst signals from the output signal of amplifier 120. The color burst signals represent color phase reference information required to demodulate the chrominance signals. The color burst signals are coupled to a locked oscillator 126 which serves to generate a signal having the same frequency (e.g., 3.58 MHz) as the color subcarrier signal and being phase locked to the phase of the burst signal. Various known schemes for locking oscillator 126 may be employed. The output signal of the locked oscillator 126 is coupled to synchronous detector 122 where it is used to provide color phase reference signals, for example, I (in-phase) and Q (quadrature) reference signals. Synchronous detector 122 serves to demodulate the chrominance signals and ultimately to derive color difference signals representing, for example, R-Y, B-Y and G-Y information.

Signal processing unit 136 is included in luminance channel 116 and serves to attenuate undesirable signals present in luminance channel 116 such as chrominance or sound signals or both, while relatively accentuating ro peaking the amplitudes of high frequency components of the luminance signals to improve the transient response and fine detail resolution of the television receiver. The color burst signals generated by burst detector 124 are coupled to signal processing unit 136. The amplitudes of signals in a peaked amplitude portion of the amplitude versus frequency transfer characteristic of luminance channel 116 are controlled in response to the brust signals. The amplitudes of signals in the peaked amplitude portion of the amplitude versus frequency transfer characteristic of luminance channel 116 are desirably controlled in inverse relationship to the amplitude of the color burst signals. In this manner, the high frequency response of luminance channel 116 is automatically corrected since the amplitude of the color burst signals (a relatively high frequency component) is indicative of the attenuation of relatively high frequency signal components of the composite video signal due to transmission losses and the like.

It should be noted that signals derived from other portions of the composite television signal such as signals representing peak detected amplitudes of the signal in the relatively high frequency range of the composite video signal may be utilized to control the amplitudes of signals in the peaked amplitude portion of the amplitude versus frequency transfer characteristic of luminance channel 116. Such signals as vertical interval test signals (VITS) currently being proposed for calibrating television signal processing systems may also be used for this purpose. Vertical interval test signals and the like are described in an article entitled, "Progress Report on Vertical Interval Television Test Signals," by R. M. Morris and J. Serafin, appearing in *IEEE Transactions on Broadcast and Television Receivers*, Vol. PG BTS-9, pages 65–69, December 1957. It should also be noted that it may also be desirable to control the amplitudes of signals in the peaked amplitude portion of the amplitude versus frequency transfer characteristic of luminance channel 116 in direct relationship to the amount of color information in the composite television signals. This may be desirable if the bandwidth of the luminance channel extends into the frequency range of the chrominance or sound signals so as to avoid the generation of undesirable patterns resulting from the interaction of luminance signals and chrominance or sound signals (or both).

Signal processing unit 136 may also serve to equalize the time delays of the signals processed in chrominance channel 114 and luminance channel 116.

The output signals of signal processing unit 136 are coupled to a luminance processing unit 138 which serves to amplify and otherwise process the luminance signals to produce the output signal (Y) of luminance channel 116.

The Y output signal of luminance channel 116 and the R-Y, B-Y and G-Y color difference output signals of chrominance channel 114 are coupled to a kinescope driver 128, where they are matrixed to form R, B and G color signals. The R, B and G color signals drive a kinescope 130.

A constrast control unit 132 is coupled to luminance processing unit 138 to control the amplitude of the luminance signals and thereby control the contrast of the images produced by kinescope 130. A brightness control unit 134 is also coupled to luminance processing unit 138. Suitable contrast and brightness control arrangements are described in U.S. Pat. No. 3,804,981, entitled, "Brightness Control," issued to Jack Avins on Apr. 16, 1974, and assigned to the same assignee as the present invention.

Another portion of the output signal of video processing unit 112 is coupled to sync separator 140 which separates horizontal and vertical synchronization pulses from the video signal. The synchronization pulses are coupled from sync separator 140 to deflection circuits 142. Deflection circuits 142 are coupled to kinescope 130 and high voltage unit 144 to control the deflection or sweep of an electron beam in kinescope 130 in a conventional manner. Deflection circuits 142 also generate blanking signals which are coupled to luminance processing unit 138 to inhibit the output of luminance processing unit 138 during the horizontal and vertical retrace periods to ensure cutoff of kinescope 130 during these respective periods. Horizontal deflection circuit 142 also generates the burst gate signal which is coupled to burst detector 124.

A channel (not shown) is also provided for processing sound signals.

The general circuit arrangement shown in FIG. 1 is suitable for use in a color television receiver of the type shown, for example, in RCA Color Television Service Data 1970 No. T19 (a CTC-49 type receiver), published by RCA Corporation, Indianapolis, Indiana.

Signal processing unit 136 includes signal delaying means 150, shown as a delay line, and a plurality of signal coupling means or taps, 152*a*, 152*b*, 152*c*, coupled to delay means 150 at successive points. The combination of signal delaying means 150 and taps 152*a*, 152*b* and 152*c* is sometimes referred to as a tapped delay line. Although signal delaying means 150 is shown as a delay line, it may be any other suitable device for delaying a video signal such as an array of charge coupled devices (CCD's) or charge transfer devices. Although taps 152*a*, 152*b* and 152*c* are shown as being directly connected to delay line 150, they may be coupled to the delay line in any other suitable manner providing for signal coupling such as capacitive coupling or the like.

Taps 152*a*, 152*b* and 152*c* are coupled to delay line 150 at spaced intervals to develop respective delayed video signals $a_1$, $b_1$ and $c_1$ delayed in time in relation to the input video signal $v_{i1}$, by respective time intervals $T_{D1}$, $T_{D1}+T_{11}$ and $T_{D1}+T_{11}+T_{21}$. Delay line 150 includes a portion 156 having a time delay interval $T_{D1}$ prior to tap 152*a*, selected with respect to other portions of delay line 150 for equalizing the time delays of the signals processed in luminance channel 116 and chrominance channel 114. For this purpose, it is desirable that the sum of $T_{D1}$ and $T_{11}$ equal the difference between the time delays of the signals processed in chrominance channel 114 and luminance channel 116. In addition, it should be noted that a signal resulting from the combination of signals developed at taps symmetrically disposed around a given point of a delay line may be considered to have a time delay equal to the average of the time delays of the combined signals. Therefore, if taps 152a and 152c are symmetrically disposed around tap 152b, the output signal derived by combining signals developed at taps 152a, 152b and 152c will have a time delay which is equal to the time delay required to equalize the time delays of the signals processed in the chrominance and luminance channels.

Taps 152a, 152b and 152c are respectively coupled to amplitude controlling or signal weighting means 154a, 154b and 154c. Amplitude controlling means 154a, 154b and 154c serve to modify the amplitude of delayed video signals $a_1$, $b_1$ and $c_1$ by respective predetermined gain or weight values to generate a plurality of respective amplitude controlled or weighted signals. Amplitude controlling means 154a, 154b and 154c may be formed by any suitable gain control circuit, including, for example, an amplifier or an attenuator, wherein the gain may be set to predetermined values above and below unity.

The amplitude controlled signals produced by amplitude controlling means 154a, 154b and 154c are coupled to a summing circuit 158 where the amplitude controlled signals produced by amplitude controlling means 154a and 154c are algebraically subtracted from the amplitude controlled signal produced by amplitude controlling means 154b to produce a combined signal $v_{p1}$. Summing circuit 158 may be formed by any suitable circuit for algebraically summing signals such as an operational amplifier, a resistive matrix or the like.

Although amplitude controlling means 154a, 154b and 154c are shown coupled to each tap 152a, 152b and 152c to show the general functional arrangement of signal processing unit 136, they may not be specifically provided in all cases. Thus, for example, if a predetermined gain value equal to 1 is desired, the particular amplitude controlling means may be only a direct connection between the respective tap and summing circuit 158. Furthermore, amplitude controlling means 154a, 154b and 154c may be included in summing circuit 158.

The combined signal produced by summing circuit 158 is labelled $v_{p1}$, the subscript $p$ denoting "peaking," since, as will be seen, $v_{p1}$ determines the peaking characteristics of signal processing unit 136. The amplitude controlled signal produced by amplitude controlling means 154b is labelled $v_{bw1}$, the subscript $bw$ denoting "bandwidth," since, as will be seen, $v_{bw1}$ when combined with $v_{p1}$ determines the bandwidth characteristic of signal processing unit 136.

The signal $v_{p1}$ is coupled to peaking control circuit 160 which serves to modify the amplitude of $v_{p1}$ to produce a signal $Pv_{p1}$, where P is the gain of peaking control circuit 160. Peaking control circuit 160 may be formed by any suitable adjustable gain device responsive to a control signal such as an automatic gain control (AGC) amplifier and may be arranged to provide a range of gains extending from values less than unity to values greater than unity. The gain, P, of peaking control circuit 160 is controlled in response to a control signal generated by amplitude comparator 162.

Amplitude comparator 162 is responsive, for example, to the color burst signals generated by burst detector 124 and a D.C. reference voltage and serves to generate a D.C. control signal representing the difference between the amplitude of the burst signals and the reference voltage. Amplitude comparator 162 may include, for example, a peak detector for detecting the amplitude of the burst signals and differential amplifier arrangement whose inputs are rspectively coupled to the reference voltage and the output signal of the peak detector. Thus, the amplitude of the signal $pv_{p1}$ is controlled in accordance with the deviation of the peak amplitude of the burst signals from a reference signal. Since the amplitude of the burst signals is indicative of the attenuation of high frequency components of the video signals, it is desirable to arrange peaking control circuit 160 so that its gain is controlled in an inverse relationship to the amplitude of the control signal generated by amplitude comparator 162.

The signals $Pv_{p1}$ and $v_{bw1}$ are coupled to summing circuit 164 where they are algebraically added to produce the output signal $v_{o1}$ of signal processing unit 136.

The operation of signal processing unit 136 will be explained by way of example wherein the pair of taps 152a and 152c are symmetrically located around tap 152b and the time intervals $T_{11}$ and $T_{21}$ are equal to 1/f, where $f$ is the frequency of a signal component of the composite video signal, $v_{i1}$, which may undesirably be present in luminance channel 116. For instance, $f$ may be the frequency of a signal in the range of frequencies of the chrominance or sound subcarrier or both. More specifically, $f$ may be the color subcarrier frequency (e.g., 3.58 MHz) or the sound subcarrier frequency (e.g., 4.5 MHz). Further, by way of example, the predetermined gain values of amplitude controlling means 154a, 154b and 154c preferably have respective values of ½ , 1 and ½.

Figure 2:
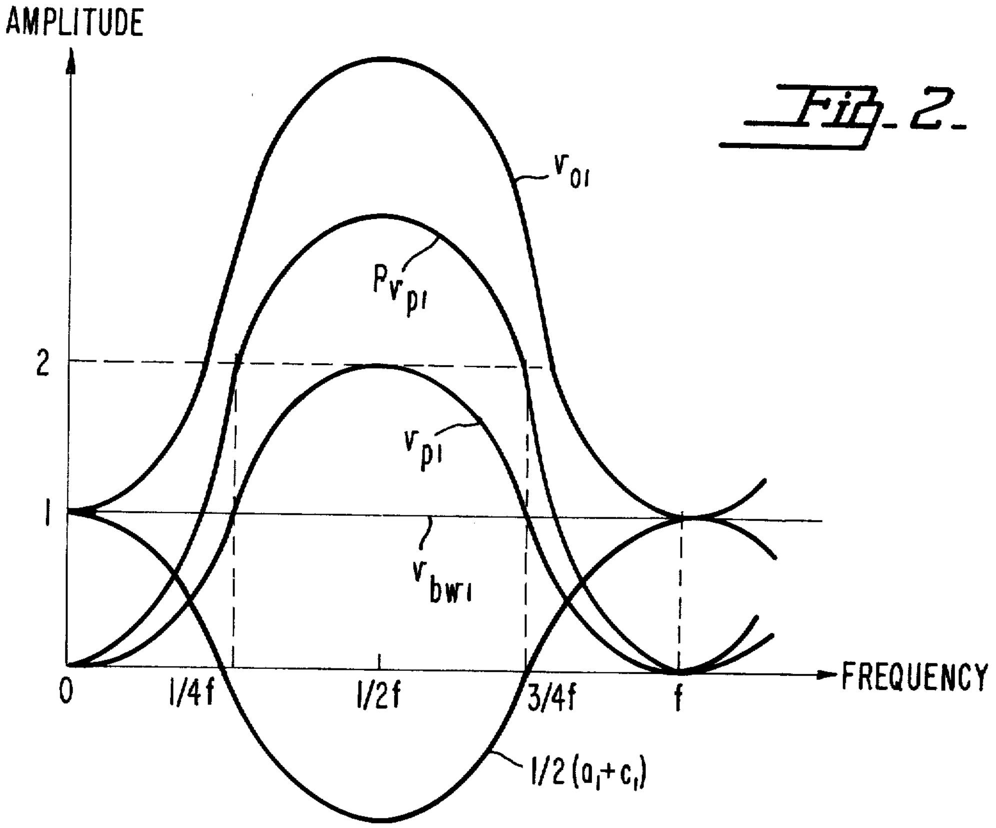
FIG. 2 shows graphical representations of various amplitude versus frequency transfer characteristics associated with signals produced in the embodiment of the present invention shown in FIG. 1.

The operation of signal processing unit 136 of FIG. 1 may best be understood with reference to FIG. 2, whhich shows graphical representations of amplitude versus frequency transfer characteristics associated with signals produced by signal processing unit 136 of FIG. 1.

Before describing FIG. 2, the amplitude versus frequency transfer characteristics of a tapped delay line or similar device will be briefly discussed. The amplitude versus frequency transfer characteristic of a portion of a delay line which contributes a time delay T to applied signals may be expressed as a coefficient which varies exponentially as a function of frequency, i.e., $e^{-j\ \ T}$, $e$ being the natural logarithm base. It should be noted that the amplitude versus frequency transfer characteristic associated with a signal developed at a tap located at a reference point where T=0 is by definition flat, since $e^0$=1. It should be further appreciated that the amplitude versus frequency transfer characteristic associated with a signal produced by algebraically adding two signals generated at respective taps symmetrically located about a reference point varies as a cosine function.

Referring now to FIG. 2, there are shown graphical representations of amplitude versus frequency transfer characteristics associated with signals $v_{bw1}$, $v_{p1}$, $Pv_{p1}$ and $v_{o1}$ generated by signal processing unit 136 of FIG. 1. These amplitude versus frequency transfer characteristics are labelled $v_{bw1}$, $v_{p1}$, $Pv_{p1}$ and $v_{o1}$. In FIG. 2 there is also shown a graphical representation of the amplitude versus frequency characteristic, labelled $½(a_1+c_1)$, associated with the signal resulting from the algebraic addition of the amplitude controlled signals produced by amplitude controlling means 154a and 154c of FIG. 1. With the example values given above, the signals $v_{bw1}$, $v_{p1}$, $Pv_{p1}$ and $v_{o1}$ are derived from delayed video signals $a_1$, $b_1$ and $c_1$ by signal processing unit 136 according to the following expressions:

$$v_{bw1} = b_1 \quad (1)$$

$$v_{p1} = v_{bw1} - \tfrac{1}{2}(a_1+c_1) \quad (2)$$

$$Pv_{p1} = P[v_{bw1} - \tfrac{1}{2}(a_1+c_1)] \quad (3)$$

$$v_{o1} = Pv_{p1} + v_{bw1} \quad (4)$$

The amplitude versus frequency transfer characteristic of FIG. 2 can be understood by considering the location of tap 152*b* as a reference point. With this in mind, it is seen that the amplitude versus frequency transfer characteristic of $v_{bw1}$ is by definition flat. Since the amplitude versus frequency transfer characteristic of a signal derived by algebraically adding signals developed at a pair of symmetrically disposed taps is a cosine function, the amplitude versus frequency transfer characteristic associated with $\frac{1}{2}(a_1+c_1)$ is a cosine function having a recurrence rate of $f$, a minimum amplitude point at $f/2$ and a maximum amplitude point at $f$. Since $v_{p1}$ is produced by algebraically subtracting $\frac{1}{2}(a_1+c_1)$ from $v_{bw1}$, the amplitude versus frequency transfer characteristics associated with $v_{p1}$ and $Pv_{p1}$ are cosine functions having recurrence rates of $f$, maximum amplitude points at $f/2$ and minimum amplitude points at $f$. Since $v_{o1}$ is produced by algebraically adding $Pv_{p1}$ and $v_{bw1}$, the amplitude versus frequency transfer characteristic associated with $v_{o1}$ is a cosine function having a recurrence rate of $f$, a maximum amplitude point at $f/2$ and a minimum amplitude point at $f$ superimposed on a level determined by the preselected gain value of amplitude controlling means 154*b*.

The peaking characteristics of signal processing unit 136 of FIG. 1 are determined by the signal derived by algebraically adding delayed video signals $a_1$ and $c_1$, while the bandwidth characteristics of signal processing unit 136 are determined by the signal derived from delayed video signal $b_1$ in combination with the signal $v_{p1}$. It is desirable to space delayed video signals $a_1$ and $c_1$ apart in time by a time interval equal to NT/2, where N is an integer and T is the reciprocal of the frequency $f$. Although the preferred range of N includes integers between 2 and 5, other values of N may be useful in particular applications.

The peak amplitude of the amplitude versus frequency transfer characteristics of signal processing unit 136 is automatically controlled by controlling the amplitude of $v_{p1}$ in response to a control signal derived from a preselected portion of the video signal such as previously described with reference to FIG. 1. It is noted that although the peak amplitude of the amplitude versus frequency transfer characteristic associated with $v_{o1}$ is controlled in response to the control signal, the amplitude at D.C. (i.e., zero frequency) is not. This is so because the amplitude contribution of the amplitude versus frequency transfer characteristic associated with $Pv_{p1}$ to the amplitude versus frequency transfer characteristic associated with $v_{o1}$ is always 0 at D.C. This is desirable since picture brightness, which is determined by the D.C. component of the luminance signals, will not be affected by the control signal.

The amplitude transitions of the output signal $v_{o1}$ of signal processing unit 136 of FIG. 1 contain a preshoot just before the transition and an overshoot just after the transition. These preshoots and overshoots serve to accentuate amplitude transitions of $v_{o1}$ so that, for example, an image transition from white to black will be accentuated because the image just before the transition is whiter than it is in the original scene; and, just after the transition, the image is blacker than it is in the original scene.

Furthermore, the phase versus frequency transfer characteristics are related to the preshoots and overshoots. For example, a linear phase versus frequency transfer characteristic corresponds to the formation of equal preshoots and overshoots. The preshoots and overshoots are controlled by the signal formed by the summation of amplitude controlled signals associated with taps 152*a* and 152*c*. Therefore, although the predetermined gain values of amplitude controlling means 154*a* and 154*c* were chosen to be equal and time intervals $T_{11}$ and $T_{21}$ were chosen to be equal, resulting in a linear phase versus frequency transfer characteristic as manifested by equal preshoots and overshoots, the amplitude controlled signals associated with taps 154*a* and 154*c* may be varied to produce unequal preshoots and overshoots to compensate for phase versus frequency non-linearities in other portions of the video signals processing system.

With reference to FIG. 2, if it is desired to have a minimum amplitude at the color subcarrier frequency, e.g., 3.58 MHz, to relatively attenuate chrominance signal portions, $T_{11}$ and $T_{21}$ should be selected to be approximately equal to 280 nanoseconds, i.e., the reciprocal of the color subcarrier frequency. By selecting $T_{11}$ and $T_{21}$ to be approximately equal to 280 nanoseconds, a peak amplitude point of the amplitude versus frequency characteristic of the luminance signal will occur at approximately 1.78 MHHz. Where it is desirable to have the peak of the amplitude versus frequency characteristics occur at relatively high frequency components of the luminance signal, i.e., frequency components closer to the color subcarrier frequency (3.58 MHz), so as to tend to maximize the high frequency response of the luminance channel, the signal processing unit of FIG. 3 may be preferred over signal processing unit 136 of FIG. 1.

Figure 3:
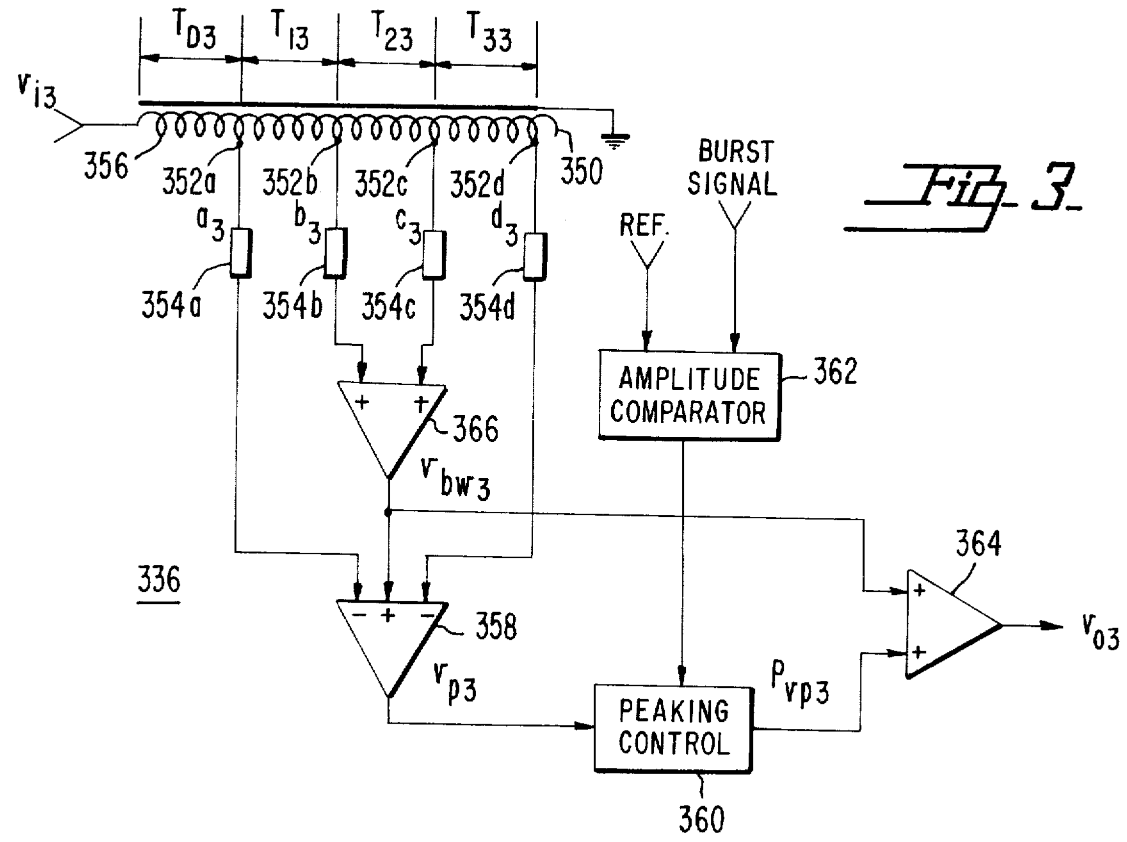
FIG. 3 shows a schematic of another embodiment of the present invention useful in the general arrangement of a color television receiver shown in FIG. 1 for processing luminance signals.

Referring now to FIG. 3, signal processing unit 336 of FIG. 3 may be utilized in place of signal processing unit 136 of FIG. 1 where it is desirable to provide relatively high frequency peaking consistent with effective trapping. Similar aspects between the signal processing units of FIG. 1 and FIG. 3 can readily be seen by a comparison of FIGS. 1 and 3. Because of these similar aspects in signal processing unit 336 of FIG. 3 and signal processing unit 136 of FIG. 1, signal processing unit 336 of FIG. 3 will not be described in detail.

Four taps 352*a*, 352*b*, 352*c*, and 352*d* are coupled to delay line 350 at spaced intervals to develop delayed video signals $a_3$, $b_3$, $c_3$ and $d_3$ delayed in time in relation to input video signal $v_{i3}$ by respective time intervals $T_{D3}$, $T_{D3}+T_{13}$, $T_{D3}+T_{13}+T_{23}$ and $T_{D3}+T_{13}+T_{23}+T_{33}$. Delay line 350 includes a portion 356 having a time delay interval $T_{D3}$ prior to tap 352*a*, selected with respect to other portions of delay line 350 for equalizing the time delays of the signals processed in the luminance channel 116 and the chrominance channel 114 of FIG. 1. For the purpose of equalizing such time delays, it is desirable that the sum of $T_{D3}$, $T_{13}$ and $T_{23}/2$ equal the difference between the time delays of the signals processed in the chrominance channel and the luminance channel. In addition, as noted above, a signal resulting from the combination of signals developed at taps symmetrically disposed around a given point of a delay line has an effective time delay equal to the average of the time delays of the combined signals, with taps 352*a*, 352*b*, 352*c*, and 352*d* symmetrically disposed around the midpoint of delay line 350 (i.e., between taps 352*a* and 352*d*), the output signal derived by combining signals developed at taps 352*a*, 352*b*, 352*c* and 352*d* will have a desired effective time delay which is equal to the time delay required to equalize the time delays of the signals processed in the chrominance and luminance channels.

The amplitude controlled signals produced by amplitude controlling means 354*b* and 354*c* are coupled to summing circuit 366 where they are algebraically added to produce a signal $v_{bw3}$ which is used to determine the bandwidth characteristics of signal processing unit 336. The amplitude controlled signals produced by the amplitude controlling means 354*a* and 354*d* are coupled to summing circuit 358 together with $v_{bw3}$. Summing circuit 358 serves to algebraically subtract the amplitude controlled signals produced by amplitude controlling means 354*a* and 354*d* from $v_{bw3}$ to produce a signal $v_{p3}$, which determines the peaking characteristics of signal processing unit 336.

The amplitude of $v_{p3}$ is modified by peaking control unit 360 in accordance with the control signal generated by amplitude comparator 362 to form $Pv_{p3}$, where P is the controlled gain of peaking control unit 360. The signals $Pv_{p3}$ and $v_{bw3}$ are algebraically added to form the output signal, $v_{o3}$, of signal processing unit 336.

The operation of signal processing unit 336 of FIG. 3 will be explained by way of example wherein taps 352*a*, 352*b*, 352*c* and 352*d* are located symmetrically around the midpoint of delay line 350 and the time intervals $T_{13}$, $T_{23}$ and $T_{33}$ are all equal to $f/2$, where $f$ is the frequency of a signal component of the composite video signal $v_{i3}$, which may undesirably be present. For instance, $f$ may be the frequency of a signal in the range of frequencies of the chrominance subcarrier or sound subcarrier or both. More specifically, $f$ may be the color subcarrier frequency (i.e., 3.58 MHz) or the sound intercarrier frequency (e.g., 4.5 MHz). Further, by way of example, the predetermined gain values of amplitude controlling means 354*a*, 354*b*, 354*c* and 354*d* have respective values of ½, ½, ½ and ½.

Figure 4:
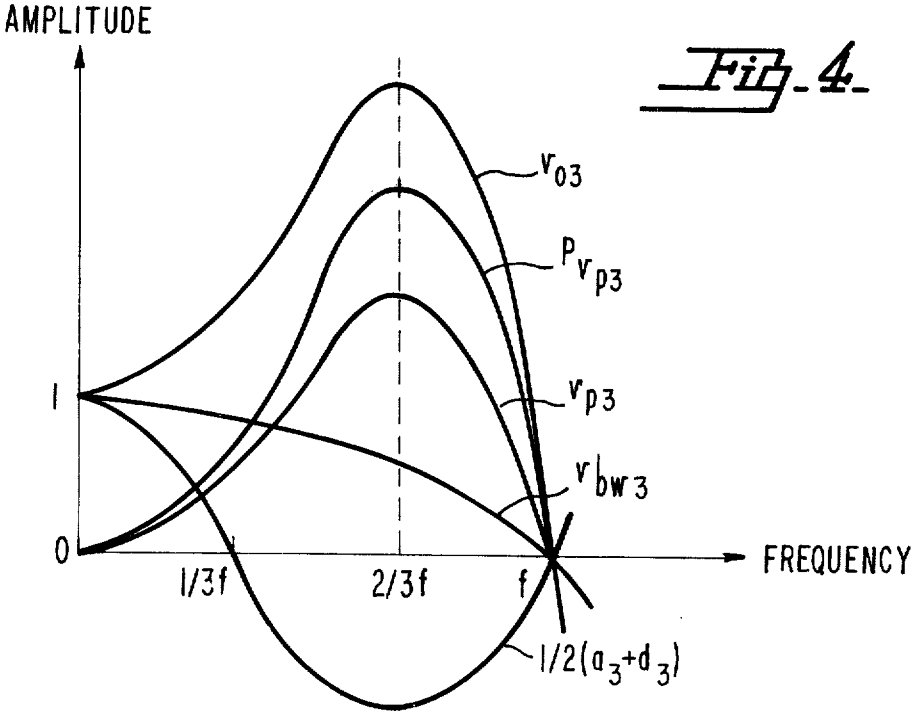
FIG. 4 shows graphical representations of various amplitude versus frequency transfer characteristics associated with signals produced in the embodiment of the present invention shown in FIG. 3.

In FIG. 4 there are shown graphical representations of amplitude versus frequency transfer characteristics associated with signals $v_{bw3}$, $v_{p3}$, $Pv_{p3}$ and $v_{o3}$ generated by signal processing unit 336 of FIG. 3. These amplitude versus frequency transfer characteristics are labelled $v_{bw3}$, $v_{p3}$, $Pv_{p3}$ and $v_{o3}$. In FIG. 4, there is also shown a graphical representation of the amplitude versus frequency transfer characteristic, labelled $\frac{1}{2}(a_3+d_3)$ associated with the signal resulting from the algebraic addition of the amplitude controlled signals produced by amplitude controlling means 354*a* and 354*d* of FIG. 3. With the example values given above, the signals $v_{bw3}$, $v_{p3}$, $Pv_{p3}$ and $v_{o3}$ are derived from delayed video signals $a_3$, $b_3$, $c_3$ and $d_3$ by signal procesing unit 336 according to the following expressions:

$$v_{bw3} = \tfrac{1}{2}(b_3+c_3) \quad (5)$$

$$v_{p3} = v_{bw3} - \tfrac{1}{2}(a_3+d_3) \quad (6)$$

$$Pv_{p3} = P[v_{bw3} - \tfrac{1}{2}(a_3+d_3)] \quad (7)$$

$$v_{o3} = v_{bw3} + P[v_{bw3} - \tfrac{1}{2}(a_3+d_3)] \quad (8)$$

The amplitude versus frequency transfer characteristics of FIG. 4 can be understood by considering the location of the midpoint of delay line 350 between taps 352*a* and 352*d* as a reference point. The amplitude versus frequency transfer characteristic associated with $v_{bw3}$ is a cosine function having a recurrence rate of 4f. The amplitude versus frequency transfer characteristic associated with $\frac{1}{2}(a_3+d_3)$ is a cosine function having a recurrence rate of 4*f*/3 and a minimum amplitude point at 2*f*/3. Since $v_{p3}$ is produced by algebraically subtracting $\frac{1}{2}(a_3+d_3)$ from $v_{bw3}$, the amplitude versus frequency transfer characteristics associated with $v_{p3}$ and $Pv_{p3}$ have maximum amplitude points at approximately 2*f*/3. Since $v_{o3}$ is produced by algebraically adding $Pv_{p3}$ and $v_{bw3}$, the amplitude versus frequency transfer characteristic associated with $v_{o3}$ has a maximum amplitude point at approximately 2*f*/3.

In FIG. 4, the amplitude versus frequency transfer characteristic associated with $v_{o3}$ has a maximum amplitude point at a relatively high frequency, 2*f*/3, in relation to the frequency $f$ of a zero amplitude point. Thus, signal processing unit 336 provides relatively high frequency peaking.

The peaking characteristics of signal processing unit 336 of FIG. 3 are determined by the signal derived by algebraically adding delayed video signals $a_3$ and $d_3$, while the bandwidth characteristics of signal processing unit 336 are determined principally by the signal derived by algebraically adding delayed video signals $b_3$ and $c_3$ in combination with $pv_{p3}$. It should be noted that it is desirable to space delayed video signals $a_3$ and $d_3$ apart in time by a time interval equal to NT/2, where N is an integer and T is the reciprocal of the frequency $f$. Although the preferred range of N includes integers between 2 and 5, other values of N may be useful in particular applications.

The peak amplitude of the amplitude versus frequency transfer characteristics of signal processing unit 336 is automatically controlled by controlling the amplitude of $v_{p3}$ in response to a control signal derived from a preselected portion of the video signal such as the burst signals or the like as previously described with reference to FIG. 1. It is noted that although the peak amplitude of the transfer characteristic associated with $v_{o3}$ varies with P, the amplitude at D.C. does not. This is so because the amplitude of the amplitude versus frequency transfer characteristic associated with $Pv_{p3}$ to the amplitude versus frequency transfer characteristic associated with $v_{o3}$ is always 0 at D.C. (i.e., zero frequency). This is desirable since picture brightness, which is determined by the D.C. component of the luminance signals, is not affected by variations of the control signal.

The amplitude transitions of the output signal $v_{o3}$ of signal processing unit 336 of FIG. 3 contain both a preshoot and an overshoot whose formation is controlled by the signal resulting from the algebraic addition of the amplitude controlled signals associated with taps 352*a* and 352*d*. These preshoots and overshoots serve to accentuate the amplitude transitions of $v_{o3}$. Furthermore, the phase versus frequency transfer characteristics are related to the presehoots and overshoots of amplitude transitions of a signal. Therefore, although the amplitude controlled signals produced by amplitude controlling means 354*a* and 354*d* were selected to produce equal preshoots and overshoots to provide a linear phase versus frequency transfer characteristic, the amplitude controlled signals produced by amplitude controlling means 354*a* and 354*d* may be selected to produce unequal preshoots and overshoots to provide compensation for non-linear phase versus frequency transfer characteristics of other portions of the television signal processing system.

With reference to FIGS. 3 and 4, it should be noted that the selection of time intervals $T_{13}$, $T_{23}$ and $T_{33}$ as 140 nanoseconds (i.e., one-half the reciprocal of the color subcarrier frequency, 3.58 MHz) may be advantageous since the amplitude versus frequency transfer characteristic associated with $v_{o3}$ will have a peak amplitude at a relatively high frequency near 3.58 MHz, approximately 2/3×3.58 MHz (i.e., 2.4 MHz) , while providing effective 3.58 MHz trapping. It should also be noted that while the time intervals $T_{13}$, $T_{23}$ and $T_{33}$ were all selected to equal a time interval corresponding to the reciprocal of a frequency $f$ of a signal undesirably present in the luminance channel by way of example, it may be desirable to otherwise select these time intervals. For example, it may be desirable to select $T_{23}$ to equal 110 nanoseconds and select $T_{13}$ and $T_{33}$ equal to 140 nanoseconds. In this case, the amplitude versus frequency characteristic associated with $v_{o3}$ will have a value substantially equal to 0 at approximately 4.1 Hz, while having peak amplitude at approximately 2/3×3.58 MHz (i.e., 2.4 MHz). Thus, the signal processing apparatus of FIG. 1 may be modified so that frequency components in the range of the chrominance and sound signals of the video signal are relatively attenuated while relatively high frequency components of the luminance signals may be relatively increased in amplitude.

Since chrominance signals tend to be differentially attenuated with respect to lower frequency signals during transmission, it may be desirable to automatically control the amplitude of chrominance signals in response to a control signal representing the amount of attenuation. This process is generally known as automatic color or chroma control (ACC). In conventional color television receivers, ACC may be accomplished by comparing the burst amplitude to a reference voltage (in an amplitude comparator such as amplitude comparator 162 of FIG. 1) and coupling the output signal of the comparator to an automatic gain control (AGC) amplifier arranged to amplify the output signal of a chrominance signal bandpass amplifier (such as amplifier 120 of FIG. 1).

It should be noted that if a closed loop ACC arrangement is provided in the color television receiver of FIG. 1, it is desirable that the control signal for peaking control unit 160 be provided by apparatus separate from the controlled portion of chrominance channel 114, since the signals representing the attenuation of high frequency components of the video signal (e.g., the burst signals) will already have been modified to accomplish ACC. Thus, for example, where a closed loop ACC arrangement is provided for, it may be desirable to provide a separate burst detector in luminance channel 116 between signal processing unit 112 and amplitude comparator 162.

Figure 5:
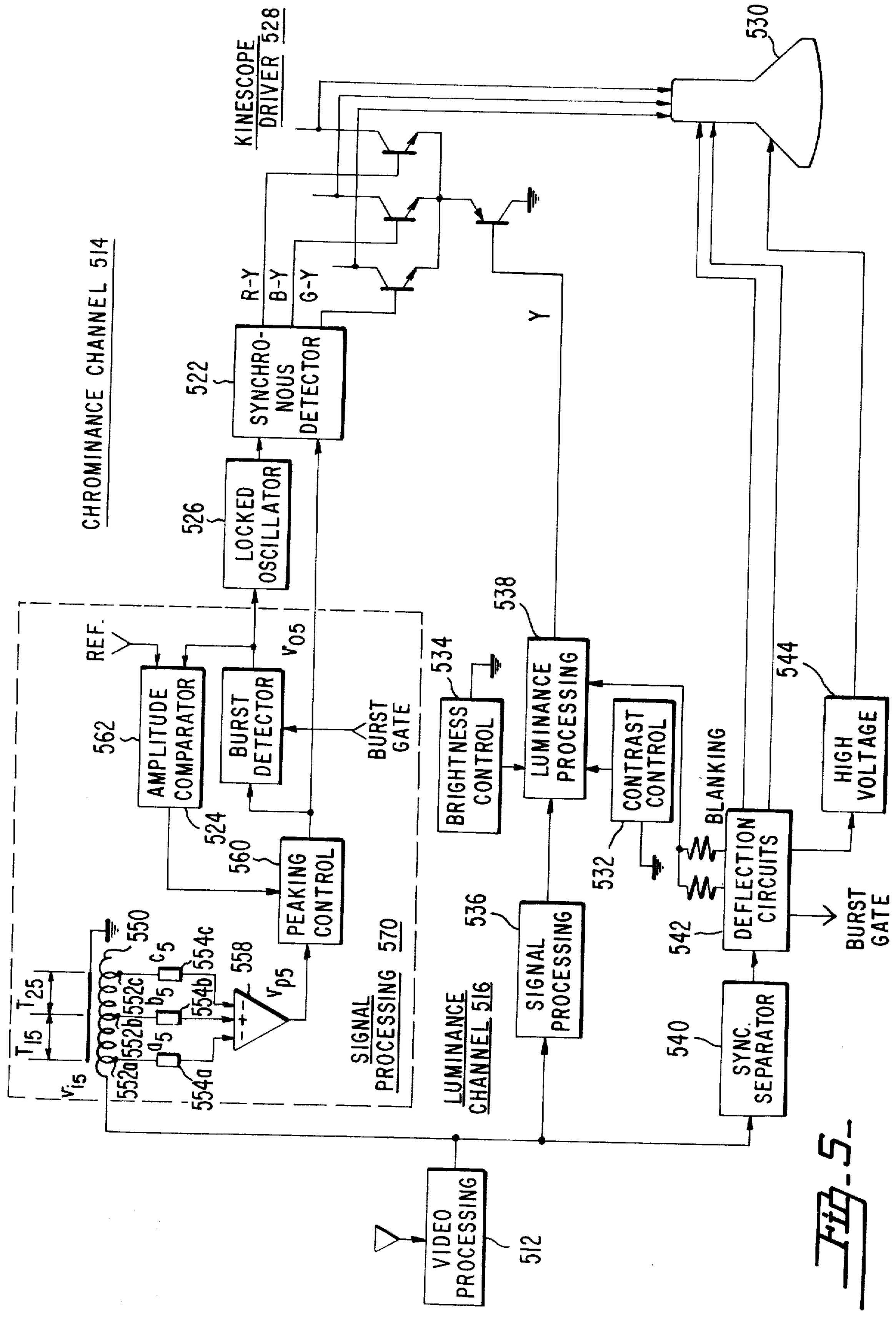
FIG. 5 shows, partially in block diagram form and partially in schematic form, the general arrangement of a color television employing another embodiment of the present invention for processing chrominance signals.

Referring now to FIG. 5, there is shown the general arrangement of a color television receiver similar to the arrangement of FIG. 1 including a signal processing unit 570 for relatively accentuating signals in the frequency range of the chrominance signals and automatically controlling the amplitude of these signals to provide ACC. Similar aspects of the apparatus of FIGS. 1 and 5 will be recognized from a comparison of FIGS. 1 and 5. Because of the similar aspects of the apparatus of FIGS. 1 and 5, the apparatus of FIG. 5 will not be described in detail.

In signal processing unit 570 of FIG. 5, composite video signal $v_{i5}$ is coupled to delay line 550. Taps 552*a*, 552*b* and 552*c* are coupled to delay line 550 at spaced intervals to develop video signals $a_5$, $b_5$ and $c_5$, being respectively delayed in relation to $v_{i5}$ by time intervals of 0 ($a_5$ being identical with $v_{i5}$), $T_{15}$ and $T_{25}$. The amplitudes of $a_5$, $b_5$ and $c_5$ are respectively modified by amplitude controlling means 554*a*, 554*b* and 554*c* and coupled to summing circuit 558 where the amplitude controlled signals produced by amplitude controlling means 554*a* and 554*c* are algebraically subtracted from the amplitude controlled signal produced by amplitude controlling means 554*b* to form a signal $v_{p5}$.

The amplitude versus frequency transfer characteristic associated with $v_{p5}$ is similar to that associated with $v_{p1}$ of FIG. 2. Since the location of the peak amplitude point of this amplitude versus frequency transfer characteristic is determined by the addition of the amplitude controlled signals associated with amplitude controlling means 554*a* and 554*d*, for the purpose of relatively accentuating signals in the frequency of the chrominance signals, it is desirable to choose the time interval $T_{15}+T_{25}$ approximately equal to a multiple of the reciprocal of the color subcarrier frequency, e.g., 3.58 MHz, so that a peak amplitude point occurs at approximately the color subcarrier frequency. Thus, for example, if it were desired to attenuate sound signals undesirably present in the chrominance channel while accentuating chrominance signals, $T_{15}+T_{25}$ should be selected to be approximately equal to twice the reciprocal of the color subcarrier, 3.58 MHz. This selection provides an amplitude versus frequency transfer characteristic having a peak amplitude at 3.58 MHz and a minimum amplitude at 4.5 MHz, i.e., the sound subcarrier.

The amplitude of $v_{p5}$ is modified by the gain of peaking control unit 560 to produce an output signal $v_{o5}$ similar to $Pv_{p1}$ of FIG. 2. The output signal $v_{o5}$ is coupled to burst detector 524 which serves to remove burst signals from $v_{o5}$. The burst signals are coupled to amplitude comparator 562 where the amplitude of the burst signals is compared to a reference voltage. The output signal of amplitude comparator 562, representing the amplitude degradation of the signals in the frequency range of the chrominance signals, is coupled to peaking control unit 560. The gain of peaking control unit 560 is controlled in an inverse relationship to the attenuation of the burst signals.

Thus, signal processing unit 570 is operative to relatively accentuate signals in the frequency range of the chrominance signals and to automatically adjust their amplitudes in response to a control signal representing the attenuation of the chrominance signal to effect automatic color control.

Figure 6:
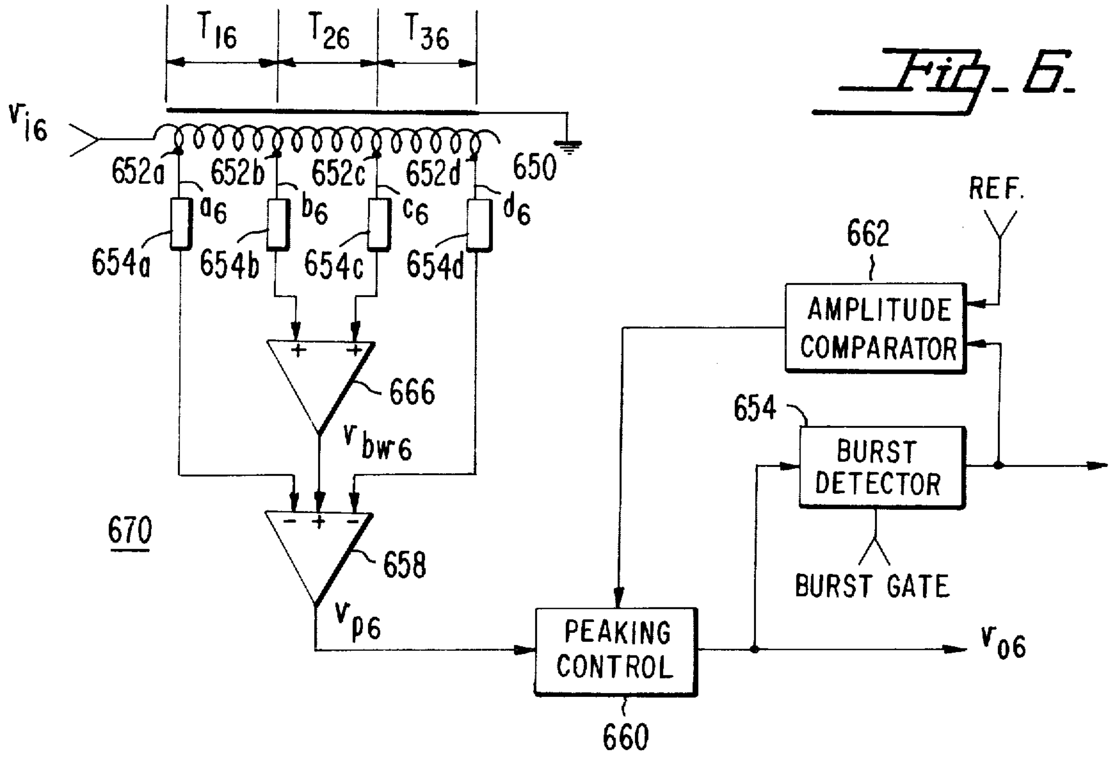
FIG. 6 shows another embodiment of the present invention useful in the general arrangement of a color television receiver shown in FIG. 5 for processing chrominance signals.

In FIG. 6, there is shown another signal processing unit 670 for relatively accentuating chrominance signals and automatically controlling their amplitude in response to a control signal representing their attenuation. Signal processing unit 670 may be advantageous over signal processing unit 570 of FIG. 5 in that it provides for relatively high frequency peaking consistent with a relatively small bandwidth, so that, for example, chrominance signals may be more readily separated from the luminance and sound signals.

Composite video signal $v_{16}$ is coupled to delay line 650. Taps 652*a*, 652*b*, 652*c* and 652*d* are coupled to delay line 650 at spaced intervals to develop delayed video signals $a_6$, $b_6$, $c_6$ and $d_6$, being respectively delayed in relation to $v_{16}$ by time intervals of 0 ($a_6$ being identical with $v_{16}$), $T_{16}$, $T_{16}+T_{26}$ and $T_{16}+T_{26}+T_{36}$. The amplitudes of $a_6$, $b_6$, $c_6$ and $d_6$ are respectively modified by amplitude controlling means 654*a*, 654*b*, 652*c* and 654*d*. The amplitude controlled signals produced by amplitude controlling means 654*b* and 654*c* are coupled to summing circuit 666 where they are added to produce a signal $v_{bw6}$ similar to $v_{bw3}$ of FIG. 4. The amplitude controlled signals produced by amplitude controlling means 654*a* and 654*d* and signal $v_{bw6}$ are coupled to summing circuit 658 where the amplitude controlled signals produced by amplitude controlling means 654*a* and 654*d* are algebraically subtracted from $v_{bw6}$ to produce a signal $v_{p6}$ similar to $v_{p3}$ of FIG. 4.

The location of the amplitude peak of the amplitude versus frequency transfer characteristic associated with $v_{p6}$ is determined by the signal produced by the algebraic addition of the amplitude controlled signals produced by amplitude controlling means 654*a* and 654*d* and having an amplitude versus frequency transfer characteristic similar to that of $\frac{1}{2}(a_3+d_3)$ of FIG. 4. For the purpose of extracting chrominance signals from the composite video signals, it is desirable that the time interval $T_{16}+T_{26}+T_{36}$ be approximately equal to the reciprocal of the color subcarrier frequency, e.g., 3.58 MHz, so that a peak amplitude point occurs at approximately the color subcarrier frequency.

The signal $v_{bw6}$, when combined with the amplitude controlled signals produced by amplitude controlling means 654*a* and 654*d*, determines the bandwidth of the amplitude versus frequency transfer characteristic associated with $v_{p6}$. Since $v_{bw6}$ is formed by algebraically adding the amplitude controlled signals produced by amplitude controlling means 654*b* and 654*c*, it is desirable to select the time interval $T_{26}$ approximately equal to 130 nanoseconds such that the amplitude versus frequency transfer characteristic associated with $v_{p6}$ has an amplitude of approximately zero at 4.5 MHz, i.e., the sound subcarrier.

It is noted that the amplitude versus frequency transfer characteristic associated with $v_{p6}$ (similar to the amplitude versus frequency transfer characteristic of $v_{p3}$ in FIG. 4) is unsymmetrical about the location of the peak amplitude point, 2*f*/3. That is, the location of the peak amplitude point is relatively near the location of a zero amplitude point, *f*. As a result, relatively high frequency components of the chrominance signals are relatively accentuated in comparison to lower frequency components of the chrominance signals. This may be desirable since the chrominance signals tend to be more attenuated with increasing frequency.

In addition, the bandwidth of the amplitude versus frequency transfer characteristic associated with $v_{p6}$ has a narrower bandwidth and a steeper high frequency roll-off (decreasing amplitude with increasing frequency) characteristic than does the amplitude versus frequency transfer characteristic associated with $v_{p5}$. As a result, chrominance signals may be more readily separated from luminance and sound signals by signal processing unit 670 than by signal processing unit 570 of FIG. 5.

Furthermore, since the side bands, e.g., the I and Q side bands, associated with the chrominance signals are unbalanced, the non-symmetrical shape of the amplitude versus frequency transfer characteristic associated with signal processing unit 670 may be particularly suited to processing chrominance signals.

The amplitude of $v_{p6}$ is modified by the gain of peaking control unit 660 in response to a control signal produced by amplitude comparator 662 in a manner similar to that described with respect to signal processing unit 570 of FIG. 5 to produce output signal $v_{o6}$.

What is claimed is:

1. Apparatus for processing television video signals, including luminance, chrominance and color burst signal components, comprising:

a source of video signals:

signal delaying means coupled to said source of video signals;

a plurality of signal coupling means coupled to said signal delaying means for developing a plurality of delayed video signals;

first means for combining at least a first and a second of said delayed video signals spaced apart in time by a time interval substantially equal to NT/2, where T is the period of a preselected signal component supplied by said source and N is an integer greater than one, to produce a first combined signal;

means for deriving a bandwidth determining signal from at least a third of said delayed video signals located in time between said first and second delayed video signals;

second means for combining said bandwidth determining signal and said first combined signal to produce a second combined signal;

means for deriving a control signal from a predetermined portion of said video signals;

means for controlling the amplitude of said second combined signal in accordance with said control signal to produce a resultant signal; and third means for deriving an output signal from at least said resultant signal.

2. The apparatus recited in claim 1 wherein said first means provides the sum of said first and second delayed video signals.

3. The apparatus recited in claim 2 wherein said second means provides the difference between said bandwidth determining signal and said first combined signal.

4. The apparatus recited in claim 3 wherein said third means provides the sum of said resultant signal and said bandwidth determining signal.

5. The apparatus recited in claim 4 wherein T is selected so that the amplitudes of relatively high frequency components of said luminance signals are relatively accentuated.

6. The apparatus recited in claim 5 wherein said bandwidth determining signal is derived by summing said third delayed video signal and a fourth delayed video signal, said third and fourth delayed video signals being spaced apart in time by a time interval selected so that signal components in a frequency range above the frequency range of the accentuated luminance signals are relatively attenuated.

7. The apparatus recited in claim 6 wherein the amplitude of said second combined signal is controlled in accordance with the amplitude of said chrominance signals.

8. The apparatus recited in claim 7 wherein the amplitude of said second combined signal is controlled in direct relationship to the amplitude of said chrominance signals.

9. The apparatus recited in claim 8 wherein said means for deriving a control signal provides a signal representing the amplitude of said burst signals.

10. The apparatus recited in claim 3 wherein said means for deriving a control signal is coupled to said output signal.

11. The apparatus recited in claim 10 wherein T is selected so that the amplitudes of said chrominance signals are relatively accentuated.

12. The apparatus recited in claim 11 wherein said bandwidth determining signal is derived by summing said third delayed video signal and a fourth delayed video signal, said third and fourth delayed video signals being spaced apart in time by a time interval selected so that signal components in a frequency range above the frequency range of the accentuated chrominance signals are relatively attenuated.

13. The apparatus recited in claim 12 wherein the amplitude of said second combined signal is controlled in accordance with the amplitude of said chrominance signals.

14. The apparatus recited in claim 13 wherein said second combined signal is controlled in direct relationship to the amplitude of said chrominance signals.

15. The apparatus recited in claim 14 wherein said means for deriving a control signal provides a signal representing the amplitude of said burst signals.

* * * * *

UNITED STATES PATENT OFFICE
CERTIFICATE OF CORRECTION

PATENT NO. : 3,919,714

DATED : November 11, 1975

INVENTOR(S) : Joseph Peter Bingham

It is certified that error appears in the above-identified patent and that said Letters Patent are hereby corrected as shown below:

Column 1, Line 13, "televisin" should read --television--. Column 4, Lines 24 & 25, that portion reading "The luminance, sound and synchronizing signal components" should be deleted. Column 4, Line 46, that portion reading "chhrominance" should read --chrominance--. Column 5, Line 10, that portion reading "ro" should read --or--. Column 5, Line 18, that portion reading "brust" should read --burst--. Column 5, Lines 31 & 32, that portion reading "signal" should read --signals--. Column 6, Line 3, that portion reading "constrast" should read --contrast--. Column 8, Line 34, that portion reading "whhich" should read --which--. Column 8, Line 44, that portion reading "$e^{-j\ T}$" should read --$e^{-j\omega T}$--. Column 10, Line 31, that portion reading "MHHz" should read --MHz--. Column 14, Line 6, after the word "develop" insert --delayed--. Column 15, Line 1, that portion reading "$V_{16}$" should read --$V_{i6}$--.

Signed and Sealed this

*sixth* Day of *April 1976*

[SEAL]

*Attest:*

RUTH C. MASON
*Attesting Officer*

C. MARSHALL DANN
*Commissioner of Patents and Trademarks*